United States Patent
Yu et al.

(10) Patent No.: US 8,281,063 B2
(45) Date of Patent: Oct. 2, 2012

(54) DATA PROGRAMMING METHODS AND DEVICES FOR PROGRAMMING DATA INTO MEMORIES

(75) Inventors: Cheng-Chih Yu, Taoyuan County (TW); Wu-Chi Kuo, Kaohsiung (TW); Hsiao-Chun Pan, Taoyuan County (TW); Chi-Hsiang Hung, Taipei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 879 days.

(21) Appl. No.: 12/244,131

(22) Filed: Oct. 2, 2008

(65) Prior Publication Data

US 2010/0011152 A1    Jan. 14, 2010

(30) Foreign Application Priority Data

Jul. 11, 2008    (TW) ................................ 97126262 A

(51) Int. Cl.
*G06F 13/00* (2006.01)
(52) U.S. Cl. ................. 711/103; 711/E12.008
(58) Field of Classification Search ........................ None
See application file for complete search history.

(56) References Cited

U.S. PATENT DOCUMENTS

| | | | |
|---|---|---|---|
| 6,897,976 B2 | 5/2005 | Tanaka et al. | |
| 7,058,784 B2 | 6/2006 | Wang | |
| 7,930,487 B1 * | 4/2011 | Faibish et al. | 711/147 |
| 2007/0088666 A1 * | 4/2007 | Saito | 707/1 |
| 2008/0183949 A1 * | 7/2008 | Ly et al. | 711/103 |
| 2008/0320209 A1 * | 12/2008 | Lee et al. | 711/103 |

OTHER PUBLICATIONS

English language translation of abstract of TW 200700985 (published Jan. 1, 2007).

* cited by examiner

*Primary Examiner* — Edward Dudek, Jr.
*Assistant Examiner* — Sean D Rossiter
(74) *Attorney, Agent, or Firm* — Thomas|Kayden

(57) ABSTRACT

A data programming device is provided and comprises a non-volatile memory, a volatile memory, and a memory control unit. The non-volatile memory is arranged for programming data. The volatile memory is arranged for temporarily storing data. The memory control unit is arranged for receiving data and determining whether the data is programmed into the non-volatile memory or stored into the volatile memory. If the data exceeds one page, the memory control unit programs a first portion of the data into the non-volatile memory and stores a second portion of the data, which is insufficient for one page, into the volatile memory.

19 Claims, 3 Drawing Sheets

DATA PROGRAMMING METHODS AND DEVICES FOR PROGRAMMING DATA INTO MEMORIES

CROSS REFERENCE TO RELATED APPLICATIONS

This application claims the benefit of Taiwan application Serial No. 97126262 filed Jul. 11, 2008, the subject matter of which is incorporated herein by reference.

BACKGROUND OF THE INVENTION

1. Field of the Invention

The invention relates to a data programming method, and more particularly to a data programming method for reducing the time it takes for programming.

2. Description of the Related Art

FIG. 1 is a diagram of a conventional memory structure. A non-volatile memory, such as a flash memory, comprises at least one memory unit 100, and the memory unit 100 comprises 1024 memory blocks Block0-Block1023. Each memory block comprises 64 pages, and each page comprises four sectors. As shown in FIG. 1, the memory block BlockM comprises 64 pages Page0-Page63, and the page PageN comprises four sectors Sector0-Sector3, wherein M is a positive integer from 0 to 1023, and N is a positive integer from 0 to 63. Each sector has 512-byte storage space, and one page is a unit for data programming.

It is assumed that a conventional memory unit desires to program two data in the same page. The memory unit first receives first data to be programmed into the page Page0 of the memory block BlockM. If the page Page0 is empty, the memory unit programs the first data into the page Page0. After, when the memory unit receives second data to be programmed into the page Page0, the data of the other pages (such as Page1-Page63) are backed up into volatile memory (not shown in FIG. 1) or other memory blocks, and then the entire memory block BlockM is erased. Finally, the second data is programmed into the page Page0 of the memory block BlockM, and the un-changed data is programmed back into the memory block BlockM from the volatile memory (not shown in FIG. 1) or the other memory blocks. Since the time period taken by the memory unit to erase data is longest and next longest time period taken is the time period taken by the memory unit to program data, the time it takes for erasing data from the pages and programming data into pages can be decreased for shortening the time period for data programming.

BRIEF SUMMARY OF THE INVENTION

An exemplary embodiment of a data programming method comprises the steps: (A) determining whether data exceeds one page; (B) if the data exceeds one page, programming a first portion of the data into a non-volatile memory and storing a second portion of the data, which is insufficient for one page, into a volatile memory; (C) if the data does not exceed one page, storing the data insufficient for one page into the volatile memory; (D) determining whether a next data is programmed into the same page as the data; (E) if the next data is programmed into the same page as the data, performing the step (A); and (F) if the next data is not programmed into the same page as the data, programming the second portion of data into the non-volatile memory and performing the step (A).

An exemplary embodiment of a data programming device comprises a non-volatile memory, a volatile memory, and a memory control unit. The non-volatile memory is arranged for programming data. The volatile memory is arranged for temporarily storing data. The memory control unit is arranged for receiving data and determining whether the data is programmed into the non-volatile memory or stored into the volatile memory. If the data exceeds one page, the memory control unit programs a first portion of the data into the non-volatile memory and stores a second portion of the data, which is insufficient for one page, into the volatile memory.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
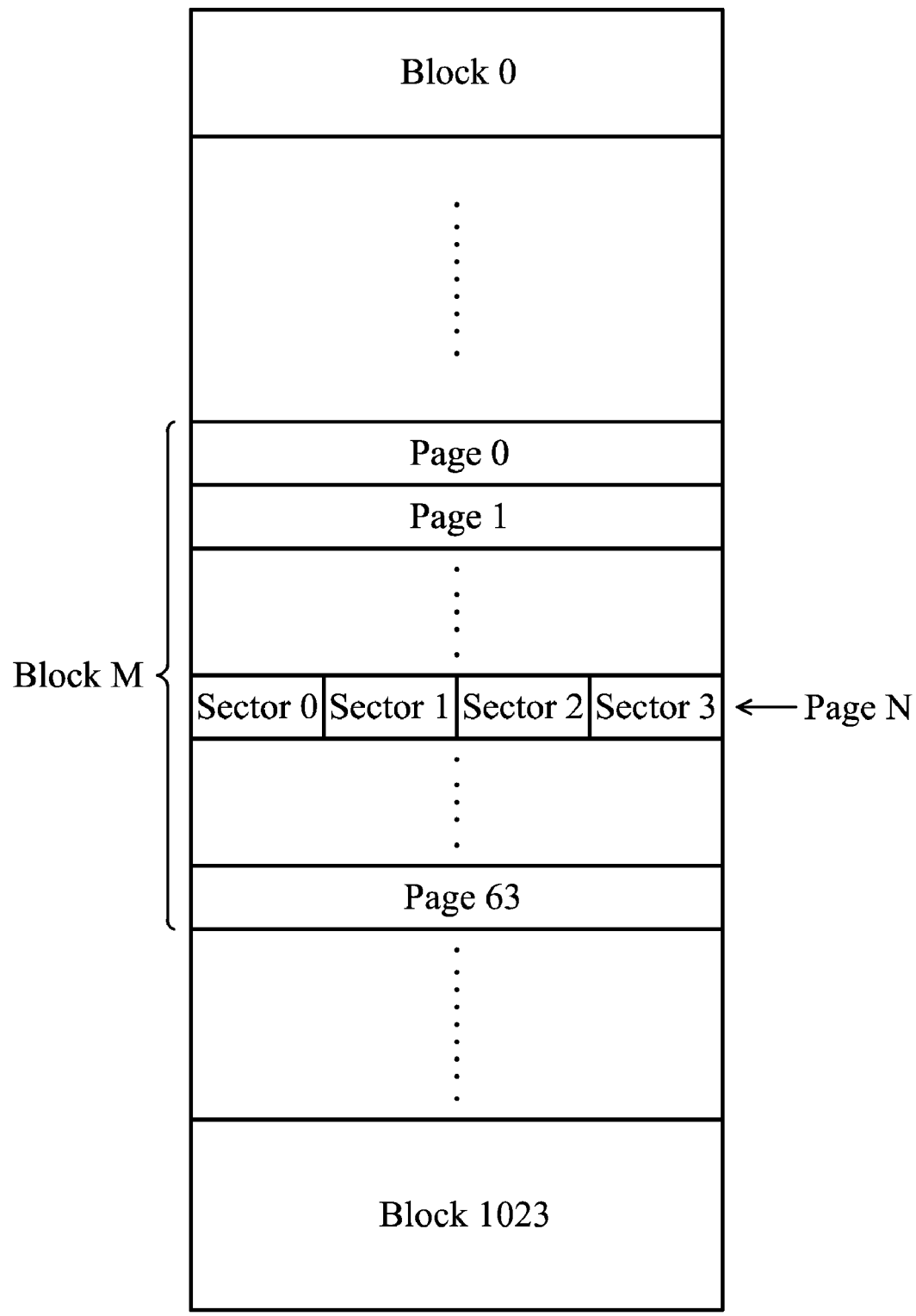
FIG. 1 is a diagram of a conventional memory structure.
Figure 2:
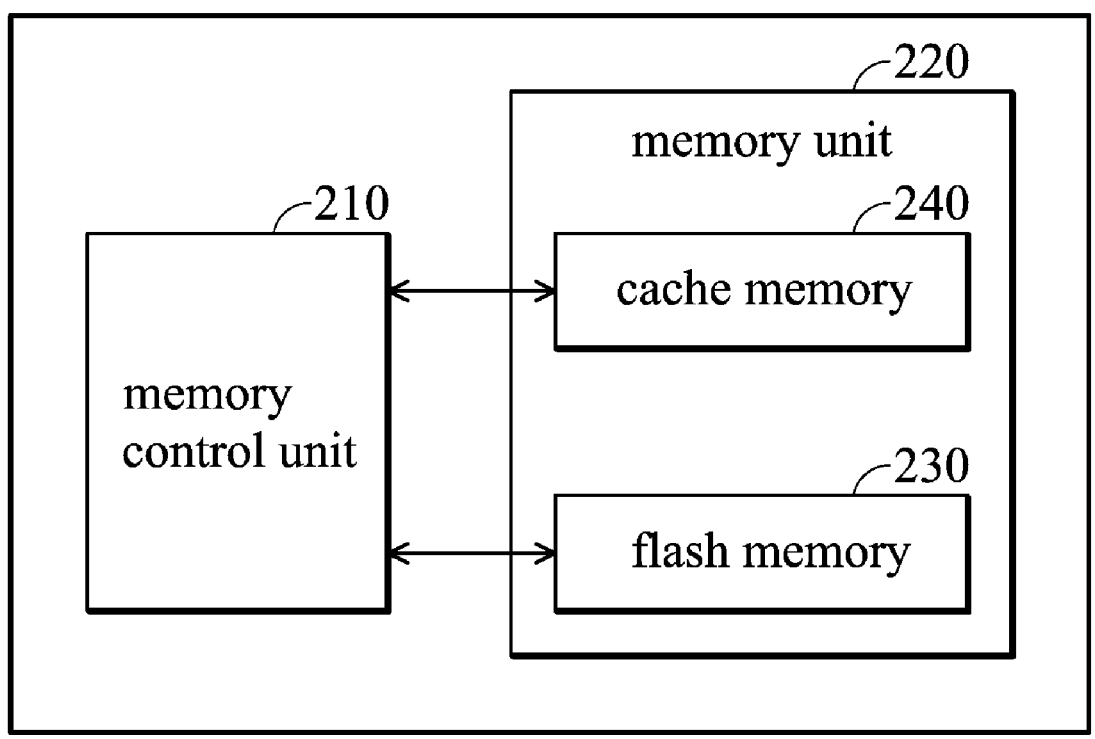
FIG. 2 shows an exemplary embodiment of a data programming device.

FIG. 2 shows an exemplary embodiment of a data programming device 200. The data programming device 200 comprises a memory control unit 210 and a memory unit 220. The memory control unit 210 comprises a non-volatile memory 230 and a volatile memory 240. In an embodiment, the volatile memory 240 is implemented by a cache memory, and the non-volatile memory 230 is implemented by a NAND flash memory. In another embodiment, the non-volatile memory 230 comprises at least one single-level cell (SLC), at least one multi-level cell (MLC), or a combination of at least one SLC and at least one MLC. The data programming device 200 can be a solid state drive (SSD) or a memory card device. According to memory specifications, if the number of programs (NOP) is equal to 1, each page of a memory programs data once after the page has been erased. Since the time period for erasing data is longest and the next longest time period is the time period for programming data for pages of a non-volatile memory, decreasing the times of erasing data or programming data for pages of a non-volatile is an objective of the present invention.

In one embodiment, the memory control unit 210 receives data and a logic address from a host (not shown in FIG. 2) and determines the data to be stored into the cache memory 240 or programmed into the flash memory 230 according to the logic address and the data length. If the data length exceeds one page, the memory control unit 210 programs the data into the flash memory 230. In other words, the data of at least one page is programmed into the flash memory 230, and the remaining data which is insufficient for one page is programmed into the cache memory 240. If data is insufficient for one page, the memory control unit 210 stores the data insufficient for one page into the cache memory 240 and then determines whether the next data is to be programmed into the same page as the data already programmed into the cache memory 240. If the next data is not determined to be suitable for programming into the same page as the data already stored in the cache memory 240, the memory control unit 210 switches the data of the cache memory 240 to be programmed into the flash memory 230 and determines whether the next data exceeds one page to determine whether the next data should be programmed into to the flash memory 230. If the next data is determined to be programmed into the same page as the data already programmed into the cache memory 240, the memory control unit 210 determines whether the remaining data (in the cache memory 240) plus the next data exceeds one page to determine whether the remaining data plus the next data is programmed into to the flash memory 230. Moreover, if the time period when the memory control unit 210 is waiting to program data exceeds a predetermined time period, the memory control unit 210 directly programs the remaining data of the cache memory 240 into the flash memory 230. A data programming method in the memory is described in detail by the following embodiments.

Figure 3:
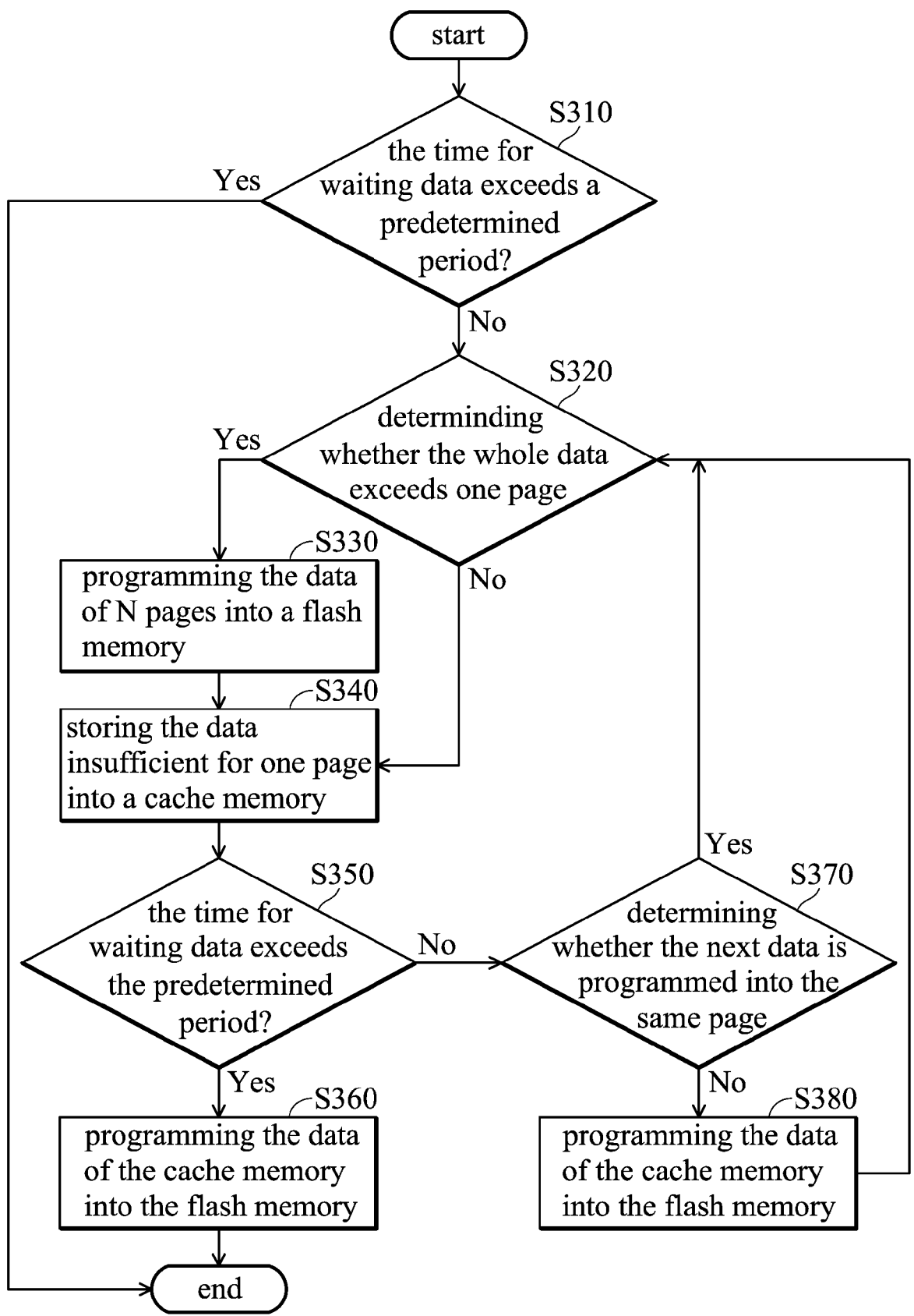
FIG. 3 is a flow chart of an exemplary embodiment of a data programming method.

FIG. 3 is a flow chart of an exemplary embodiment of a data programming method. When the time period when the memory control unit 210 is waiting to program data exceeds a predetermined time period (step S310), the memory control unit 210 finishes the data programming process. If the memory control unit 210 receives data in the predetermined time period, the memory control unit 210 determines that all data exceeds one page (step S320). If all the data exceeds one page, the data of N pages is programmed into the flash memory 230 (step S330), and the remaining data which is insufficient for one page is stored into the cache memory 240 (step S340). If all the data is insufficient for one page, the memory control unit 210 stores the data insufficient for one page into the cache memory 240 (step S340). Next, the memory control unit 210 waits for a next data. If the time for waiting for a next data exceeds the predetermined time period (step S350), the memory control unit 210 programs the data of the cache memory 240 into the flash memory 230 (step S360). If the memory control unit 210 receives the next data in the predetermined time period, the memory control unit 210 determines whether the next data is determined to be programmed into the same page as the remaining data already stored into the cache memory 240 (step S370). If the next data should be programmed into the same page as the data of the cache memory 240, the process proceeds to the step S320 to determine whether the remaining data plus the next data exceeds one page or not. If the next data should not programmed into the same page as the data of the cache memory 240, the memory control unit 210 programs the remaining data of the cache memory 240 into the flash memory 230 (step S380), and the process proceeds to the step S320 to determined whether all the data exceeds one page.

According to the embodiments, the data insufficient for one page is stored into the cache memory 240, and then, when all the data exceeds one page, the data of the cache memory is programmed into the flash memory 230. Thus, the time period for programming and erasing data of the flash memory 230 is decreased, resulting in a shortened time period for programming data of the memory unit 100.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data programming method for a data programming device having a non-volatile memory and a volatile memory, the method comprises:
   (A) determining whether data exceeds one page;
   (B) when the data exceeds one page, programming a portion of the data into the non-volatile memory and storing a remaining portion of the data, which is insufficient for one page, into the volatile memory;
   (C) when the data does not exceed one page and is exactly one page, programming the data into the non-volatile memory;
   (D) when the data does not exceed one page and is insufficient for one page, storing the data into the volatile memory;
   (E) determining whether a next data is programmed into the same page as the data stored in the volatile memory;
   (F) when the next data is programmed into the same page as the data stored in the volatile memory, performing the step (A); and
   (G) when the next data is not programmed into the same page as the data stored in the volatile memory, programming the data stored in the volatile memory into the non-volatile memory and performing the step (A).

2. The data programming method as claimed in claim 1 further comprising directly programming the data stored in the volatile memory into the non-volatile memory when a time period for waiting for data exceeds a predetermined time period.

3. The data programming method as claimed in claim 1, wherein the non-volatile memory is implemented by a flash memory, and the volatile memory is implemented by a cache memory.

4. The data programming method as claimed in claim 1, wherein the non-volatile memory comprises at least one single-level cell (SLC), at least one multi-level cell (MLC), or a combination of at least one SLC and at least one MLC.

5. The data programming method as claimed in claim 1, wherein the non-volatile memory comprises at least one page, and the at least one page of the non-volatile memory is programmed by data once after the least one page of the non-volatile memory has been erased.

6. The data programming method as claimed in claim 1, wherein the non-volatile memory comprises at least one page, and the at least one page of the non-volatile memory is programmed by data for a predetermined number of times after the least one page of the non-volatile memory has been erased.

7. The data programming method as claimed in claim 1, wherein the non-volatile memory comprises at least one memory unit, each memory unit comprises at least one memory block, and each memory block comprises at least one page.

8. A data programming device comprising:
   a non-volatile memory for programming data;
   a volatile memory for temporarily storing data; and
   a memory control unit for receiving data and determining whether the data is programmed into the non-volatile memory or stored into the volatile memory;
   wherein the memory control unit determines whether the data exceeds one page;
   wherein when the data exceeds one page, the memory control unit programs a portion of the data into the non-volatile memory and stores a remaining portion of the data, which is insufficient for one page, into the volatile memory;

wherein the memory control unit determines whether a next data is determined to be programmed into the same page as the data stored in the volatile memory; and wherein when the next data is not determined to be programmed into the same page as the data stored in the volatile memory, the memory control unit programs the data stored in the volatile memory into the non-volatile memory.

9. The data programming device as claimed in claim 8, wherein when the data does not exceed one page and is insufficient for one page, the memory control unit stores the data into the volatile memory.

10. The data programming device as claimed in claim 8, wherein when the next data is not determined to be programmed into the same page as the data stored in the volatile memory, the memory control unit determines whether the next data exceeds one page to determine whether the next data should be programmed into the non-volatile memory.

11. The data programming device as claimed in claim 8, wherein when the next data is determined to be programmed into the same page as the data stored in the volatile memory, the memory control unit determines whether the data stored in the volatile memory plus the next data exceeds one page to determine whether the data stored in the volatile memory plus the next data is programmed into the non-volatile memory.

12. The data programming device as claimed in claim 8, wherein the memory control unit is implemented by a solid state drive or a memory card device.

13. The data programming device as claimed in claim 8, wherein when time period the memory control unit is waiting to receive data exceeds a predetermined value, the memory control unit directly programs the data stored in the volatile memory into the non-volatile memory.

14. The data programming device as claimed in claim 8, wherein the non-volatile memory is implemented by a flash memory, and the volatile memory is implemented by a cache memory.

15. The data programming device as claimed in claim 8, wherein the non-volatile memory comprises at least one single-level cell (SLC), at least one multi-level cell (MLC), or a combination of at least one SLC and at least one MLC.

16. The data programming device as claimed in claim 8, wherein the non-volatile memory comprises at least one page, and the memory control unit programs data into the least one page of the non-volatile memory once after the least one page of the non-volatile memory has been erased.

17. The data programming device as claimed in claim 8, wherein the non-volatile memory comprises at least one page, and the memory control unit programs data into the least one page of the non-volatile memory for a predetermined number of times after the least one page of the non-volatile memory has been erased.

18. The data programming device as claimed in claim 8, wherein the non-volatile memory comprises at least one memory unit, each memory unit comprises at least one memory block, and each memory block comprises at least one page.

19. The data programming device as claimed in claim 8, wherein when the data does not exceed one page and is exactly one page, the memory control unit programs the data into the non-volatile memory.

* * * * *